Patented Dec. 4, 1951

2,577,700

UNITED STATES PATENT OFFICE 2,577,700

THIONOIMIDAZOLIDYLETHYL DITHIOCARBAMATES

Willard J. Croxall, Bryn Athyn, and Chien-Pen Lo, Philadelphia, Pa., assignors to Rohm & Haas Company, Philadelphia, Pa., a corporation of Delaware No Drawing. Application October 26, 1950, Serial No. 192,353

6 Claims. (Cl. 260—299)

This invention relates to 2-thionoimidazolidylethyl dithiocarbamates in the form of salts. These compounds have the structural formula

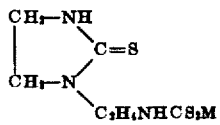

where M is a salt-forming ion or group. This invention also concerns fungicidal compositions which comprise one or more of these dithiocarbamates, said compositions being useful in horticultural or agricultural sprays or dusts.

The thionoimidazolidylethyl dithiocarbamates are prepared by reacting 1-(beta-aminoethyl)-2-imidazolidinethione with carbon bisulfide in the presence of an alkaline substance which is capable of forming a salt with an acid. The 1-(beta-aminoethyl)-2-imidazolidinethione or N-(beta-aminoethyl)-N,N'-ethylenethiourea is dissolved in a solvent therefor, such as water. There is added carbon bisulfide and a basic substance, such as sodium hydroxide, potassium hydroxide, ammonium hydroxide, trimethylbenzylammonium hydroxide, calcium hydroxide, or a strongly basic amine such as trimethylamine, dimethylamine, triethanolamine, ethanolamine, etc. The reaction may be run between 0° and 45° C. The temperature of the reacting mixture may be controlled by external cooling, if necessary.

A soluble dithiocarbamate may be converted to an insoluble salt by metathesis. Thus, a solution of the dithiocarbamate and a solution of a metal salt, such as copper sulfate, zinc sulfate, cadmium sulfate, ferrous sulfate, ferric chloride, or the like are mixed. The salt formed by metathesis is separated.

The following examples are illustrative of the preparation of compounds of this invention.

Example 1

A solution was made of 29 parts by weight of 1-(beta-aminoethyl) 2-imidazolidinethione in 100 parts of water. Thereto 11 parts of a 48% solution of sodium hydroxide was added. While the solution was stirred, there was slowly added 25.3 parts of carbon bisulfide with the temperature kept between 25° and 35° C. After the addition of carbon bisulfide was complete, the reaction mixture was stirred for 7.5 hours. It was warmed on a steam bath to drive off excess carbon bisulfide and then cooled. A white precipitate formed. It was removed by filtration and identified as N,N' - bis-beta - (2 - thionoimidazolidyl) ethyl thiourea, a solid melting at 235°-237° C. The filtrate was evaporated under reduced pressure on a steam bath to a relatively small volume of solution. This was treated with about five volumes of acetone. A yellow crystalline product separated out. The mixture was cooled and filtered. The crystals were washed with acetone and dried by exposure to air. The weight of dried product was 36 parts. It melted with effervescence at 230°-133° C. and corresponded in composition to sodium beta-1-(2-thionoimidazolidyl) ethyl dithiocarbamate with three molecules of water of crystallization. The product contained by analysis 14.4% of nitrogen (theory for the trihydrate 14.1%).

A solution of this salt was made and tested for its inhibiting effect on spores of standard test fungi on agar plates. At dilutions of 0.1% or 0.01% the salt completely inhibited germination of spores of Sclerotinia fructicola and Macrosporium sarcinaeforme Cav. At 0.005% it gave 97% inhibition of spores of Sclerotinia fructicola and 77% inhibition of spores of Macrosporium sarcinaeforme. When solutions containing 1% or 0.1% of this salt were applied to green plants, no phytotoxic effects were observed.

Example 2

There was dissolved in 400 parts of water 48 parts of sodium beta-1-(2-thionoimidazolidyl)-ethyl dithiocarbamate trihydrate. A solution of 14 parts of zinc chloride was made in 200 parts of water. The two solutions were mixed. A white precipitate formed immediately. It was collected on a filter, washed with water, and air-dried. The product corresponded closely in composition to zinc beta-1-(2-thionoimidazolidyl)-ethyl dithiocarbamate trihydrate. Analyses gave the following data: nitrogen 15.0%, sulfur 35.3%, zinc 12.6%, and water 11%. Theoretical values are 15.0%, 34.4%, 11.7%, and 9.4% respectively.

This salt even at 0.005% completely inhibited germination of spores of Macrosporium sarcinaeforme. It resisted removal from test plates subjected to a water spray for four to eight minutes, as shown by inhibiting germination of spores of both of the above organisms on test plates thus sprayed.

Example 3

To a solution of 48 parts of the above sodium salt in 400 parts of water was added a tenth mole of copper sulfate in aqueous solution. A black precipitate formed. It was filtered off, washed, and air-dried, being then yellow in color. This product contained six moles of water per mole of cupric beta-1-(2-thionoimidazolidyl) ethyl dithiocarbamate. It contained 18.8% of nitrogen (theory 13.75%).

Example 4

To a solution of 48 parts of the above sodium salt in 600 parts of water there was added a solution of 29 parts of ferrous sulfate ($FeSO_4 \cdot 7H_2O$) in 200 parts of water. A dark yellow precipitate formed. It was collected on a filter, washed, and dried to give 41 parts of a product which contained two moles of water per mole of ferrous beta-1-(2-thionoimidazolidyl)ethyl dithiocarbamate. Analyses of the dried product gave the following data: nitrogen 16.2%, sulfur 35.3%, and water 6.1%. Theoretical values are 15.8%, 36.0%, and 6.7% respectively.

Dispersions of this salt even at 0.005% gave complete inhibition of germination of spores of both *Sclerotinia fructicola* and *Macrosporium sarcinaeforme* in standard fungitoxicity tests. Tenacity tests showed 100% inhibition of germination of spores of both organisms even after 16 minutes of water spraying. The 1% and 0.1% dispersions were free of phytotoxic effects on living plants.

Example 5

To a solution of 49.5 parts of the above sodium salt in 400 parts of water there was added a solution of 15 parts of ferric chloride ($FeCl_3 \cdot 6H_2O$)

in 200 parts of water. A dark blue precipitate was formed. It was collected on a filter, washed and air-dried to give a bluish-gray product amounting to 38 parts. It was identified as ferric beta-1-(2-thionoimidazolidyl)ethyl dithiocarbamate sesquihydrate, containing by analysis 16.2% of nitrogen, 37.7% of sulfur, and 3.81% of water. Corresponding theoretical values are 16.9%, 38.8%, and 3.64% respectively.

Dispersions of this salt were made in water and used in fungitoxicity tests against *Sclerotinia fructicola* and *Macrosporium sarcinaeforme*. At 0.005% or more there was complete inhibition of the germination of the spores of these organisms. There was no evidence of phytotoxicity when sprays were applied to living plants with 1% or 0.1% of the salt.

Example 6

To a solution of 36.5 parts of the above sodium salt in 300 parts of water there was added a solution of 23 parts of bismuth ammonium citrate in 200 parts of water. A yellow precipitate was formed. It was filtered off, washed, and air-dried. It was then brown in color and amounted to 39 parts. According to analyses this salt contained four molecules of water of crystallization and contained 12.8% of nitrogen. For the compound $C_{18}H_{30}N_9S_9Bi \cdot 4H_2O$ the theoretical nitrogen content is 12.9%. A 0.1% dispersion of this salt gave 100% inhibition of germination of spores of *Sclerotinia fructicola* in a standard fungitoxicity test.

In the same way other metal salts may be prepared. Potassium hydroxide, lithium hydroxide, calcium hydroxide, strontium hydroxide, and the like may be used in place of sodium hydroxide. The soluble dithiocarbamates are readily reacted with salts of metals, such as cadmium, manganese, antimony, etc., by methods fully illustrated above.

The 1-(beta-aminoethyl)-2-imidazolidinethione is prepared by the reaction of carbon bisulfide and diethylenetriamine. A typical preparation follows.

There were mixed in a reaction vessel 106 parts by weight of diethylenetriamine and 50 parts of water. Carbon bisulfide was added thereto with stirring in an amount of 78 parts. The reacting mixture was cooled to keep its temperature between 45° and 50° C. The mixture was slowly heated. At about 60° C. there was evolution of hydrogen sulfide. Heating was continued until a batch temperature of 200° C. was reached. Meanwhile, water was taken off. The pressure in the reaction vessel was reduced to 100 mm. and held at this point for 15 minutes. The reaction mixture was cooled to about 100° C., whereupon 75 parts of ethyl alcohol was added. The mixture was stirred under reflux until it became homogeneous. It was the cooled. Crystals were formed and were separated. They were dried in vacuo at 50° C. The composition of the crystals corresponds to that of 1-(beta-aminoethyl)-2-imidazolidinethione. This compound and further details of its preparation are disclosed in application Serial No. 192,350, filed by Hurwitz and Auten on even date. As there pointed out, the ethylene chains may carry a methyl group in place of a hydrogen atom, thus yielding homologues.

The compounds of this invention may be summarized by the formula

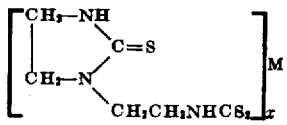

wherein M is a salt-forming group and $x$ is the valence of this group. In particular, M may be an alkali metal ion, such as sodium, potassium, or lithium, in which case $x$ has a value of one. Another very important group of salts comprises the salts of polyvalent metals where $x$ has a value of two to three, as in the case of the zinc, manganese, copper, or cadmium salts or the ferrous or ferric salts. These salts may contain $yH_2O$ where $y$ is a small number. Yet they may be dehydrated giving $y$ a value of zero.

We claim:

1. Compounds having the formula

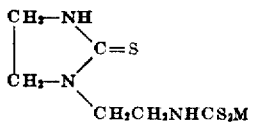

wherein M is a salt-forming group.

2. Compounds having the formula

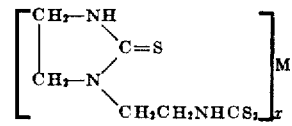

wherein M is a polyvalent metal ion and $x$ is the valence of the metal.

3. A compound of the formula of claim 2 wherein the metal is zinc and $x$ is two.

4. A compound of the formula of claim 2 wherein the metal ion is the ferrous ion and $x$ is two.

5. A compound of the formula of claim 2 wherein the metal ion is the ferric ion and $x$ is three.

6. A compound of the formula

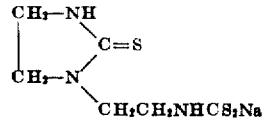

WILLARD J. CROXALL.
CHIEN-PEN LO.

No references cited.

Certificate of Correction

Patent No. 2,577,700 December 4, 1951

WILLARD J. CROXALL ET AL.

It is hereby certified that error appears in the printed specification of the above numbered patent requiring correction as follows:

Column 2, line 7, for "230°–133° C." read *130°–133° C.*; line 54, for "18.8%" read *13.8%*;

and that the said Letters Patent should be read as corrected above, so that the same may conform to the record of the case in the Patent Office.

Signed and sealed this 18th day of March, A. D. 1952.

[SEAL]

THOMAS F. MURPHY,
*Assistant Commissioner of Patents.*

Certificate of Correction

Patent No. 2,577,700 December 4, 1951

WILLARD J. CROXALL ET AL.

It is hereby certified that error appears in the printed specification of the above numbered patent requiring correction as follows:

Column 2, line 7, for "230°–133° C." read *130°–133° C.*; line 54, for "18.8%" read *13.8%*; and that the said Letters Patent should be read as corrected above, so that the same may conform to the record of the case in the Patent Office.

Signed and sealed this 18th day of March, A. D. 1952.

[SEAL]

THOMAS F. MURPHY,
*Assistant Commissioner of Patents.*